Nov. 11, 1952        H. W. HARMSEN        2,617,241

FLEXIBLE SPRING TOOTH HARROW

Filed Dec. 30, 1947        2 SHEETS—SHEET 1

INVENTOR.
Hugo W. Harmsen

BY McMorrow, Berman & Davidson
Attorneys

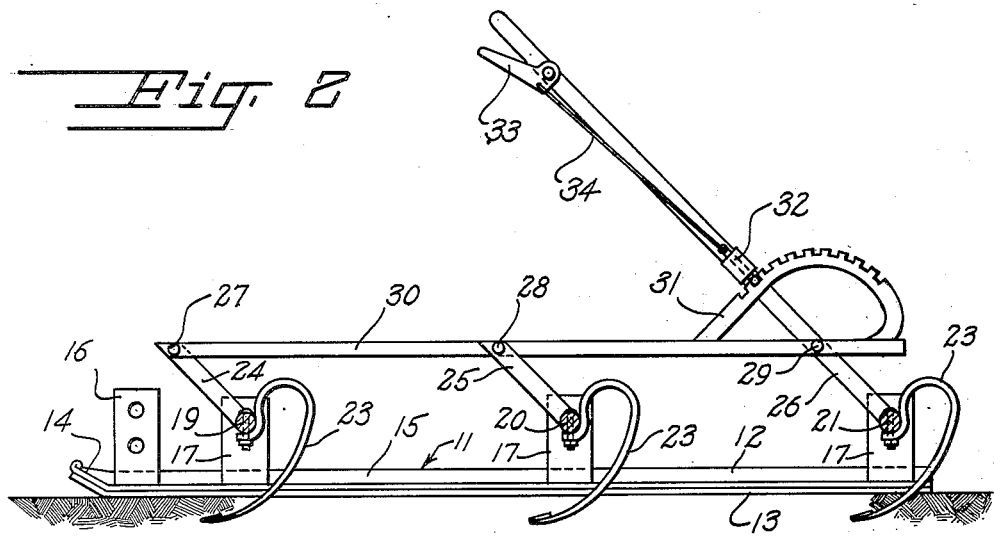
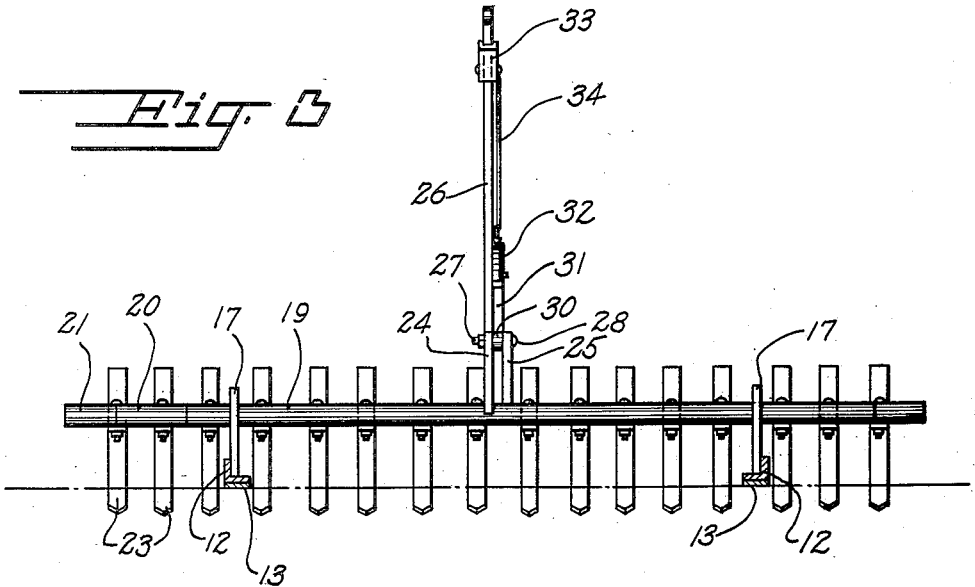

Patented Nov. 11, 1952

2,617,241

UNITED STATES PATENT OFFICE 2,617,241

FLEXIBLE SPRING TOOTH HARROW

Hugo W. Harmsen, Potter, Nebr.; Doreen Harmsen administratrix of said Hugo W. Harmsen, deceased Application December 30, 1947, Serial No. 794,721

2 Claims. (Cl. 55—104)

This invention relates to agricultural implements and more particularly to harrows.

A main object of the invention is to provide a novel and improved harrow device which is simple in construction, easy to adjust as to depth of soil penetration and which is characterized by the fact that its efficiency is not impaired by use on uneven ground.

A further object of the invention is to provide an improved harrow device which is inexpensive to manufacture, rugged in construction and which is flexible in operation so that the effectiveness thereof is not limited to level ground, the device operating to adjust itself to variations in ground contour.

Further objects and advantages of the invention will become apparent from the following description and claims, and from the accompanying drawings wherein:

Figure 2 is a longitudinal cross-sectional view taken on line 2—2 of Figure 1.

Figure 3 is a transverse cross-sectional view taken on line 3—3 of Figure 1.

Figure 1:
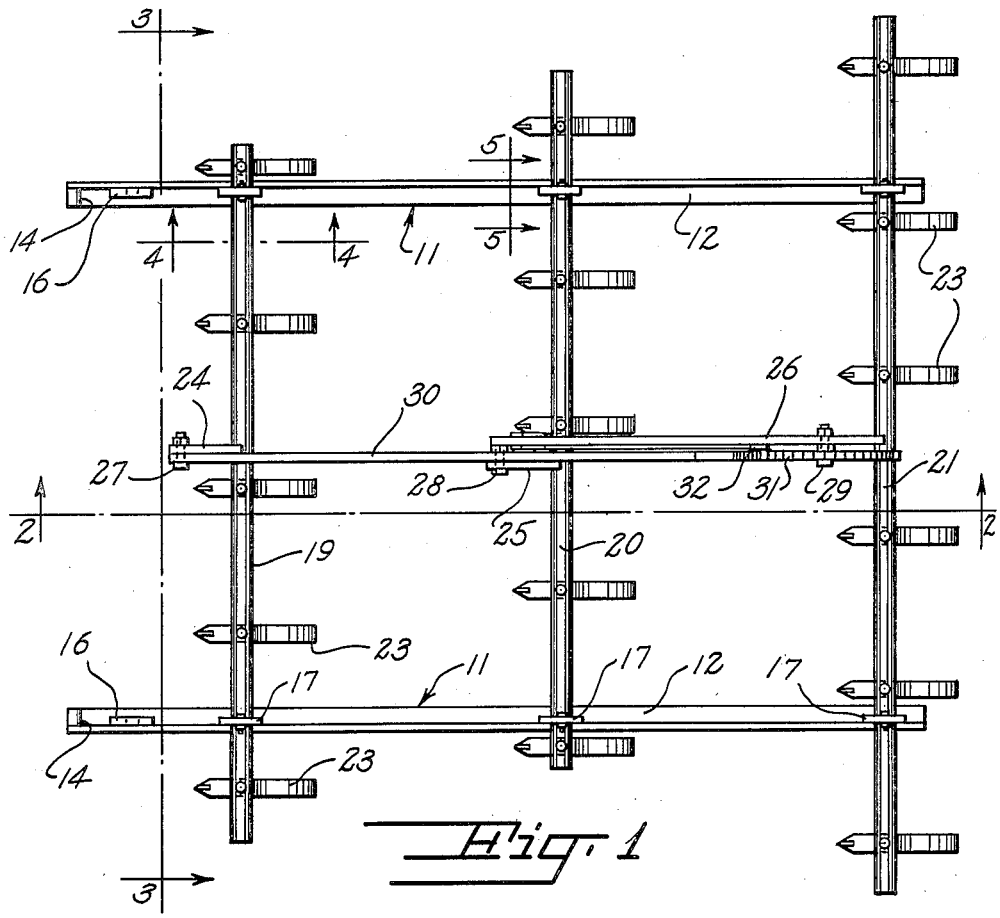
Figure 1 is a top plan view of a harrow device constructed in accordance with the present invention.
Figures 4, 5:
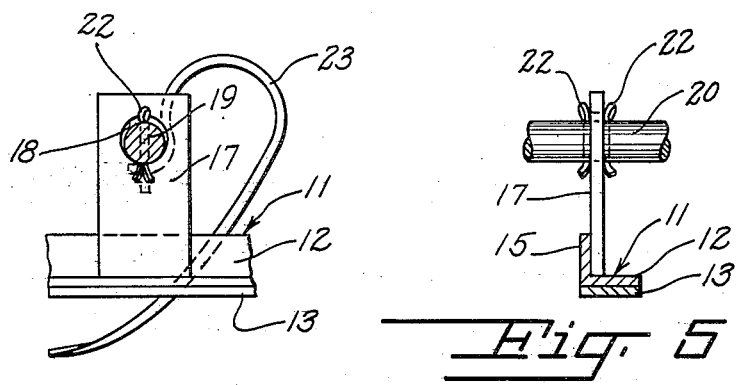
Figure 4 is an enlarged detail cross-sectional view taken on line 4—4 of Figure 1.
Figure 5 is an enlarged detail cross-sectional view taken on line 5—5 of Figure 1.

Referring to drawings, 11, 11 designate a pair of runners arranged in parallel relation, said runners comprising longitudinal angle bars 12 having welded to their bottom flanges wear strips 13. The runners are bent upwardly at their forward ends, as shown at 14.

Secured to the upstanding vertical flanges 15 of the runners adjacent their forward ends are apertured plate members 16, 16 defining hitch brackets for connection to a suitable tractor means. Also secured to flanges 15 at longitudinally spaced locations thereon are upstanding plate members or standards 17, each plate member or standard being formed at its upper portion with a circular aperture 18. Loosely received in the circular apertures of opposing plate members 17 are transverse rod members or shafts 19, 20 and 21, the forward rod member or shaft 19 projecting laterally beyond one side of the device, the rod member or shaft 20 projecting laterally beyond the other side of the device, and the rear rod member or shaft 21 projecting laterally on both sides of the device. The rod members are secured against axial movement with respect to the plate members or standards 17 and against angling with respect thereto by cotter pins 22, 22 passing through openings in the rod members. The cotter pins 22, 22 however do not restrain the rod members from moving vertically in the apertures 18, said vertical movement being available since the apertures 18 are substantially larger than the cross-sections of the rod members.

Secured to each rod member are a plurality of uniformly spaced curved tines 23 of spring steel or the like which extend downwardly and forwardly under the rod members and engage the ground as the device is drawn forwardly. As shown in Figure 1, the tines 23 of the respective rod members are staggered relative to each other to provide a uniform harrowing action over the entire width of the path of travel of the device as it is drawn forwardly. Substantially in the central longitudinal plane of the device the rod members or shafts have rigidly secured thereto the respective upstanding levers or arms 24, 25 and 26, the rear arm being of substantial length. Pivotally connected to the top ends of arms 24 and 25 at 27 and 28 and to rear arm 26 at 29 is a longitudinal link bar 30, whereby the arms 24, 25 and 26 are linked together to rotate in unison. Secured to the rear portion of bar 30 is an upstanding toothed sector bar 31. Rear arm 26 is provided with a spring biased detent device 32 having a dog lockingly engageable with the toothed sector bar 31. Pivoted to the top end portion of rear arm 26 is a release handle 33 connected by a rod 34 to said dog and arranged so as to withdraw the dog from locking engagement with toothed sector 31 when the handle 33 is rotated clockwise, as viewed in Figure 2. The detent device 32 enables the arms 24, 25 and 26 to be locked in any desired position of angular adjustment with respect to the plate members 17, whereby the angular positions of the tines 23 may be adjusted as desired.

In operation, when the device is drawn forwardly the tines 23 penetrate the soil with spring action. Since the rods or shafts 19, 20 and 21 have a certain degree of free vertical movement with respect to the plate members 17, the tines 23 will adjust themselves to engage low spots in the ground with substantially the same degree of efficiency as high spots. This permissive vertical shifting of the rod members combined with the resiliency of the tines provides a uniform harrowing action even over ground of substantial irregularity of contour.

While a specific embodiment of a harrowing device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a harrow, a pair of laterally spaced ground engaging runners having standards rising therefrom at intervals therealong, said standards being formed with openings adjacent to their upper ends, shafts extending between said runners, said shafts having end portions smaller in diameter than said openings and loosely extending through the openings of certain of the standards whereby said shafts are enabled to move freely vertically relative to the standards, means on said shafts acting between the shafts and the standards engaged thereby serving to limit endwise movement of the shafts relative to the standards in opposite directions while permitting limited angling of the shafts relative to the standards, said means and said shafts together acting to maintain said runners in substantial parallelism and serving as the sole connection between the runners, whereby said runners can move vertically relative to said shafts as the harrow is moved forwardly over uneven ground, and flexible spring teeth fixed on said shafts and projecting below said runners for entering the ground.

2. In a harrow, a pair of laterally spaced ground engaging runners having standards rising therefrom at intervals therealong, said standards being formed with openings adjacent to their upper ends, shafts extending between said runners, said shafts having end portions smaller in diameter than said openings and loosely extending through the openings of certain of the standards whereby said shafts are enabled to move freely vertically relative to the standards, means on said shafts acting between the shafts and the standards engaged thereby serving to limit endwise movement of the shafts relative to the standards in opposite directions while permitting limited angling of the shafts relative to the standards, said means and said shafts together acting to maintain said runners in substantial parallelism and serving as the sole connection between the runners, whereby said runners can move freely vertically relative to each other and said shafts can move freely vertically relative to said runners as the harrow is moved forwardly over uneven ground, and flexible spring teeth fixed on said shafts and projecting below said runners for entering the ground, said means comprising pins mounted on the shafts at opposite sides of each of the standards.

HUGO W. HARMSEN.

REFERENCES CITED

The following references are of record in the file of this patent:

UNITED STATES PATENTS

| Number | Name | Date |
| --- | --- | --- |
| 1,109,875 | Sharp | Sept. 8, 1914 |
| 1,170,761 | Kovar | Feb. 8, 1916 |
| 1,298,735 | Kovar | Apr. 1, 1919 |
| 1,345,869 | Miller | July 6, 1920 |
| 2,014,017 | Degen | Sept. 10, 1935 |
| 2,157,702 | Hoke | May 9, 1939 |